March 15, 1960

L. C. JONES 2,928,964

DYNAMOELECTRIC MACHINE WINDING COIL WITH COIL SIDES
AND END TURNS OF DIFFERENT FLEXIBILITY

Filed Dec. 23, 1957

INVENTOR.
Loren C. Jones.
BY
Schmieding and Fultz
ATTORNEYS

March 15, 1960
L. C. JONES
2,928,964
DYNAMOELECTRIC MACHINE WINDING COIL WITH COIL SIDES
AND END TURNS OF DIFFERENT FLEXIBILITY
Filed Dec. 23, 1957
2 Sheets-Sheet 2
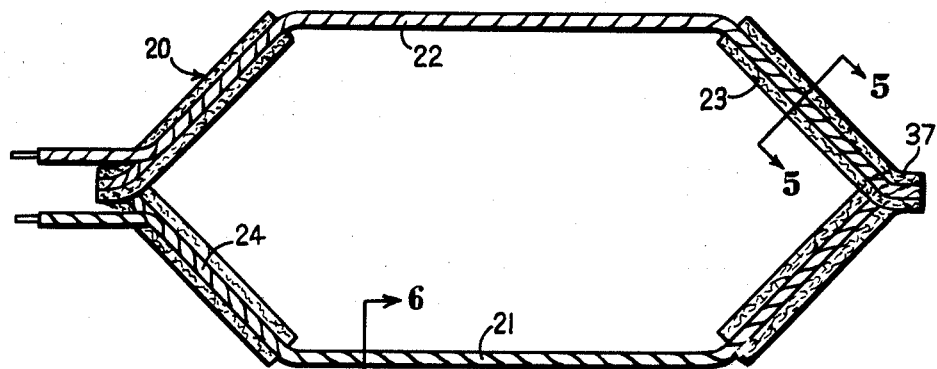
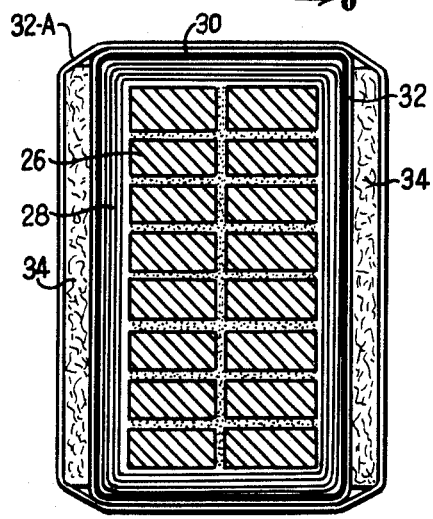
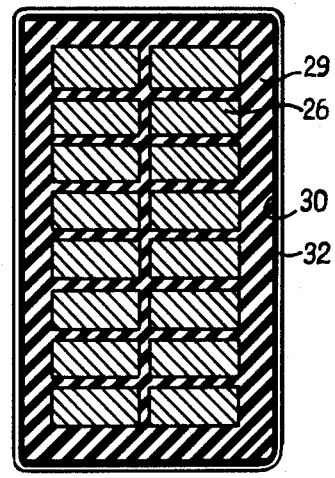
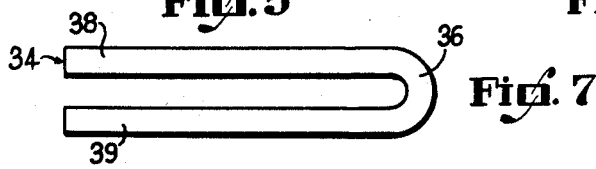
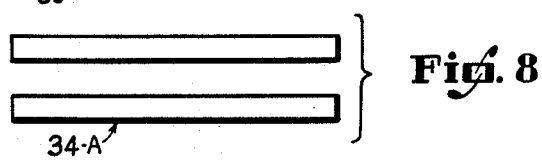
INVENTOR.
Loren C. Jones.
BY Schmieding and Fultz
ATTORNEYS United States Patent Office 2,928,964
Patented Mar. 15, 1960

2,928,964

DYNAMOELECTRIC MACHINE WINDING COIL WITH COIL SIDES AND END TURNS OF DIFFERENT FLEXIBILITY

Loren C. Jones, Columbus, Ohio, assignor, by mesne assignments, to McGraw-Edison Company, a corporation of Delaware Application December 23, 1957, Serial No. 704,573

23 Claims. (Cl. 310—208)

This invention relates to coils for rotating electrical machines and to methods for preparing insulation systems for such coils.

In the manufacture of electrical motors and generators the insulated coils employed therein comprise slot portions and end portions. When the coils are installed in an electrical machine it is necessary to insert the slot portions of such coil into radial longitudinal slots in the magnetic core of the rotor, armature, or stator of the electrical machine. In the course of inserting such slot portions of the coils into the radial slots, the coils must be flexed at the end portions, particularly when so called "lap coils" are installed, unless special costly and time consuming techniques are employed to eliminate the necessity of flexing the end turns of said "lap coils." If the insulation system applied to such end portions are not flexible, the flexing of the end portions during installation will seriously damage the insulation leading to premature failure of the winding.

It is therefore an object of the present invention to provide improved coil construction for electrical machines having a hybrid type insulation system whereby the coil insulation can be impregnated with a thermosetting resin and cured and yet maintain flexibility in the end portions. Hence the coil may be wound in the core of an electrical machine without possible damage to the insulation system using conventional winding techniques.

It is another object of the present invention to provide a method for insulating coils using a completely reactive thermosetting composition to impregnate the entire insulation system, which may be cured without effecting the desired flexibility of the insulation on the end portions, thus enabling the coils to be wound into the electrical machine without damaging the insulation.

It is another object of the present invention to provide a method for insulating a coil whereby an impervious film is utilized in a novel manner to prevent excessive run-out of the impregnant during the curing process.

It is another object of the present invention to provide a method for insulating a coil whereby pressure pads are utilized in a novel manner to consolidate the end turn insulation during the curing process.

Other objects and advantages of the present invention will be apparent from the following description, reference being made to the accompanying drawings wherein preferred forms of embodiments of the invention are clearly shown.

In the drawing:

Figure 4 is a plan view of a coil showing the application of pressure pads according to the present invention;

Figure 5 is a sectional view taken along the line 5—5 of Figure 4;

Figure 6 is a sectional view, taken along the line 6—6 of Figure 4; and

Figures 7 and 8 illustrate alternate shapes for the pressure pads illustrated in Figure 4.

Figure 1:
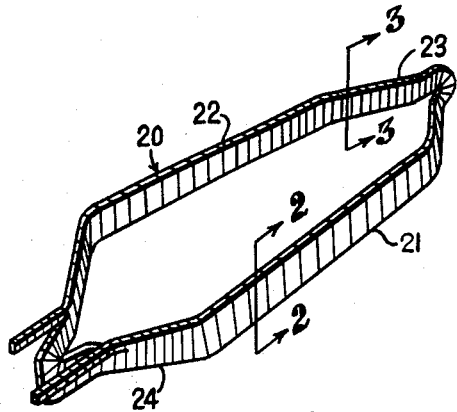
Figure 1 is a perspective view of a coil that has been constructed according to the present invention.

Referring in detail to the drawing a coil constructed according to the present invention is indicated generally at 20 and includes slot portions 21 and 22 and end portions 23 and 24.

Figure 2:
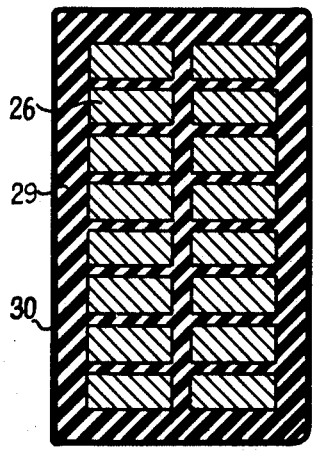
Figure 2 is a sectional view of a slot portion of the coil of Figure 1 with the section being taken along the line 2—2 of Figure 1.
Figure 3:
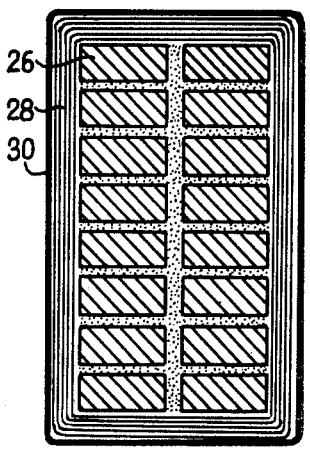
Figure 3 is a sectional view taken through an end turn portion of the coil of Figure 1 with the section being taken along the line 3—3 of Figure 1.

The slot portions and end portions each include a plurality of separate conductors 26 forming turns of the coil as is best seen in Figures 2 and 3.

According to one aspect of the present invention, slot portions 21 and 22 are wrapped with an insulating material comprising sheets of backing material with layers of mica flakes disposed between said sheets. Such insulating material for the slot portions may consist of a mica tape formed in accordance with the teachings of my co-pending application Serial No. 642,752 filed February 27, 1957, now abandoned. In accordance with one aspect of the invention of said co-pending application the use of a permanent binder in the mica tape is eliminated and instead a temporary or fugitive binder is applied to the mica tape, during the fabrication thereof, to maintain the mica material and backing material of the tape in assembled relationship during manufacture and during application of the tape to the conductors. The fugitive binder is then completely removed from the interstices of the mica material and backing material and the insulation subsequently impregnated with a completely reactive liquid polymerizable composition or other suitable impregnant.

As another aspect of the invention of my above mentioned co-pending application Serial No. 642,752 an even more efficient temporary or fugitive binder for the components of the mica tape can be formulated by a solution of a surface treating material in a volatile liquid compatible with the particular surface treating material. When such surface treating fugitive binders are utilized, the highly volatile liquid portion of the binder is removed from the interstices of the insulation, but the surface treating material will remain and form a film on the surfaces within the interstices of the mica material and backing. Such film contains a reactive organic group that not only can combine with the subsequently applied completely reactive polymerizable impregnating composition but also improves the wetting characteristics of the impregnant. Hence when such surface treating fugitive binders are employed an extremely strong bonding bridge is obtained between the impregnating composition and the surfaces within the interstices of the mica tape. Moreover, the interstices are completely filled with the impregnating composition whereby the insulation is free of voids which, if present, would be detrimental to the electrical and structural characteristics of the insulation.

An alternative type of wrapping material for slot portions 21 and 22 may consist of mica tape composed of sheets of backing material between which are sandwiched mica flakes or mica paper united with a resinous binder that compatibly mixes with a subsequently applied impregnant. Various suitable mica tapes incorporating liquid resinous bnders are described in detail in United States Letters Patent No. 2,656,290 to Berberich.

The end portions 23 and 24 are wrapped with a different type of insulating material from that applied to the slot portions 21 and 22 as described above. Prior to wrapping the end portions 23 and 24, however, it is desirable to treat the surfaces of the individual conductors 26 of the end portions, Figure 3, with a coating of a material that permits filling of all voids between the conductors but prevents bonding of the conductors by the impregnant that is subsequently applied to the coil during the impregnating cycle. Suitable materials for this application consist of the various mould release agents specifically made to prevent polymerizable liquid resins from bonding to jigs or moulds after curing. Examples of commercial release agents for this application are Dow-Corning's DC–20, Axel Plastics "Mold Wiz," and Ram's 225 release agent. Other suitable materials for treating surfaces of the individual conductors 26 consist of silicone pastes and greases. Examples of commercial materials in this category are Dow-Corning's 2007 and 2049, which are silicone pastes, and DC 3 and DC 7 which are silicone greases. These materials are inert to the subsequently applied impregnant and exhibit little or no physical change with temperature extremes encountered in service.

After the confronting surfaces of the individual conductors 26 of end portions 23 and 24 have been treated in the manner just described, the end portions 23 and 24 are wrapped with a sheet insulating material to form an insulation sheath containing voids between the layers of wrapping material and interstices in the material itself. The characteristics of this end turn insulation sheath are such that the voids and interstices are filled by the impregnant subsequentsy applied to the coil to form a void-free insulation system. This end turn insulation system, however, differs from that applied to the slot portions 21 and 22 in that the wrapping material and cured impregnant do not form a homogeneous insulation system. The system is non-homogeneous in the sense that the resinous tape binder and subsequently applied impregnant do not form a compatible mixture. This results in a boundary condition between the binder and impregnant that provides flexibility in the end turn insulation.

As one aspect of the present invention the end portions 23 and 24 may be wrapped with a wrapping material comprising sheets of backing material between which are sandwiched a layer of mica flakes or mica material with a resinous binder being utilized to unite mica and backing. In such instances, however, the resinous binder is non-reactive with the subsequently applied impregnant. The binder in this type of wrapping material for the end portions is preferably in a semi-cured form. The binder may be any one of the common varnish type resins such as plasticized natural resins, oil-modified alkyds, silicone base resins, oil-modified phenolics, thermosetting varnish of the oil-modified phenolics, or oleo-resinous types. Examples of suitable resinous liquid binders for the wrapping material are known to the trade as follows:

Silicone base resins—
    Dow-Corning's DC 997 or DC 935
    Union Carbide R–61
Oleo-Resinous Resins—
    Acme Wire Co.'s 501

As another aspect of the present invention the end portions 23 and 24 may be wrapped with rubber type wrapping material such as glass reinforced or unreinforced silicone rubber tape. The subsequently applied impregnant will fill the voids in the wrappings but does not bond them together.

Reference is next made to Figures 4 through 8 for purposes of describing the preparation of a coil according to the methods of the present invention. First, only the end portions 23 and 24 of the individual conductor 26 are treated with one of the previously described coating materials which prevents the subsequently applied impregnant from bonding said conductors together. Such treating of the surfaces allows the impregnant to fill all voids between the conductors but prevents them from being bonded together and hence allows some relative movement to occur between the conductors when the coils are being flexed during installation in an electrical machine.

The slot portions 21 and 22 are next wrapped with a mica wrapping material 29, Figure 6, containing the previously described fugitive binder that serves to unite the mica flakes and backing material during the wrapping operation.

The end portions 23 and 24 are then wrapped with one of the previously described mica wrapping materials 28, Figure 5, that are incompatible with the impregnant to be subsequently applied.

The entire coil 20 is then covered with a wrapping material 30, Figures 5 and 6, of glass, cotton, asbestos, or Dacron which acts as a protective covering.

The entire insulated coil 20 is next temporarily covered with an impervious film 32, Figures 5 and 6, usually 1 to 2 mils thick. The impervious film 32 may be formed by wrapping of polyvinyl, polytetrafluoroethylene or polyethylene terephthalate.

Pads 34 or 34–A, cut from felt sheet material, are next taped to the end portions 23 and 24 by a second serving of the impervious film as is illustrated in Figure 5. Figure 4 shows the position and location of pads 34 or 34–A, it being understood that the pad type 34, Figure 7, includes a U-shaped portion 36 which covers a side of the knuckle portion 37 as shown in Figure 4. The pad type 34–A, Figure 8, differs from pad type 34, Figure 7, in that it does not include the U-shaped portion 36 for covering the sides of the knuckle portion 34.

The coil is then subjected to a vacuum cycle to remove all volatile matter and impregnated in a liquid resinous composition of the type described in detail in my co-pending application Serial No. 462,752 filed February 27, 1957.

The slot portions 21 and 22 are next cured in conventional heated hot press dies conforming to the required finish dimensions. This operation does not heat the end portions 23 and 24 sufficiently to cure the impregnant which is subsequently accomplished by placing the coil in a heated oven.

After curing in the oven, the temporary impervious films 32 and 32–A and the felt pads 34 or 34–A are removed resulting in a finished coil ready for installation in an electrical machine.

It should be pointed out that the above mentioned application of the impervious film 32 provides a covering having tape laps that permit the escape of volatiles and air in the insulation outwardly between the laps. Furthermore, the impregnant can pass inwardly between the tape laps to completely impregnate the insulation. Once the impregnant has entered the interstices of the insulation, the impervious film 32 serves to prevent escape of the impregnant during subsequent handling of the coil.

As additional advantages of the impervious film 32, when the coil 20 is removed from the impregnating tank all excess impregnant drains rapidly from the outside of the film leaving relatively tack-free surfaces for convenience in handling in the shop. Moreover, the impervious film prevents evaporation of the impregnant and contamination of the outer surfaces of the insulation prior to curing. Equally important, impervious film 32 prevents air inhibition of the impregnating resin during the curing process and also acts as a natural mold release material between the hot press die and the slot portion insulation.

The impervious film 32 and 32–A is preferably formed of a heat shrinkable material, such as polyethelene terephthalate; so that upon the application of the heat, required to cure the impregnant, the film 32 and 32–A shrinks and thereby applies pressure that further consolidates the insulation system.

The felt pads 34 or 34–A are used to achieve uniform application of pressure over the entire side surfaces of the end portions 23 and 24 upon heat induced contraction of impervious film 32. This is particularly advantageous since conforming dies cannot be economically applied to the end turn portions 23 and 24.

It might further be mentioned that because the impervious films 32 and 32–A are removed from the coil, all surplus cured resin on the outer surfaces of the coil, particularly the contained resin at the corners along the slot portions, is removed along with the removal of film 32.

In summary, it will be understood that the resinous composition applied to the slot portions will completely fill the interstices of the mica wrap material to form a bonded homogeneous insulation system. The impregnant will also fill all voids between the conductors and bond to the conductor surfaces. In the case of the end portions, however, the surface treatment of the individual turns and the previously described wrapping material applied to the end portions allows the impregnating material to fill all interstices of the conductors and wrapping material, but prevents a rigid bond between the confronting surfaces of the individual turns and the layers of wrapping material. Hence, it will be understood that the ultimate in insulating properties is achieved in the slot portions and, at the same time, the end turn insulation is modified slightly to achieve sufficient flexibility to permit installation in the slots of an electrical machine.

While the forms of embodiments of the present invention as herein disclosed constitute preferred forms, it is to be understood that other forms might be adopted, all coming within the scope of the claims which follow.

I claim:

1. The steps in the method of insulating a coil having slot portions and a connecting end portion, for use in a rotating electrical machine, which method comprises wrapping the slot portions with a first insulating material comprising a sheet backing and mica flakes disposed on said backing, said first insulating material being impregnatable by a subsequently applied impregnant, said backing and flakes forming interstices the surfaces of which are compatible with said subsequently applied impregnant; wrapping said end portion with a second insulating material containing a binder not compatible with said subsequently applied impregnant; impregnating said wrapped coil with said impregnant comprising a liquid resinous composition; and thereafter curing said impregnant to form homogeneous insulation for said slot portions the components of which are bonded together, and to form non-homogeneous relatively flexible insulation for said end portion.

2. The steps in the method of insulating a coil having slot portions and a connecting end portion, for use in a rotating electrical machine, which method comprises wrapping the slot portions with a first insulating material comprising a sheet backing and mica flakes disposed on said backing, said first insulating material being impregnatable by a subsequently applied impregnant, said backing and flakes forming interstices the surfaces of which are compatible with said subsequently applied impregnant; wrapping said end portion with a second insulating material comprising a sheet backing and mica flakes disposed on the backing and a polymerized resinous binder uniting the mica flakes and the backing, said binder being incompatible with said subsequently applied impregnant; impregnating said wrapped coil with said impregnant comprising a liquid resinous composition; and thereafter curing said impregnant to form homogeneous insulation for said slot portions the components of which are bonded together and to form non-homogeneous relatively flexible insulation for said end portion.

3. The steps in the method of insulating a coil having slot portions and a connecting end portion, for use in a rotating electrical machine, which method comprises wrapping the slot portions with a first insulating material comprising a sheet backing and mica flakes disposed on said backing, said first insulating material being impregnatable by a subsequently applied impregnant, said backing and flakes forming interstices the surfaces of which are compatible with said subsequently applied impregnant; wrapping said end portion with a second sheet insulating material, formed of rubber or the like, incompatible with said subsequent applied impregnant; impregnating said wrapped coil with said impregnant comprising a liquid resinous composition; and thereafter curing said impregnant to form homogeneous insulation for said slot portions the components of which are bonded together and to form non-homogeneous relatively flexible insulation for said end portion.

4. The steps in the method of insulating a coil having slot portions, a connecting end portion, and a plurality of turns having confronting surfaces, for use in a rotating electrical machine, which method comprises wrapping the slot portions with a first insulating material comprising a sheet backing and mica flakes disposed on said backing, said first sheet material being impregnatable by a subsequently applied impregnant, said backing and flakes forming interstices the surfaces of which are compatible with said subsequently applied impregnant; applying to said surfaces of the turns of said end portion a coating of material incompatible with said subsequently applied impregnant; wrapping said end portion with a second insulating material containing a binder not compatible with a subsequently applied impregnant; impregnating said wrapped coil with said impregnant comprising a liquid resinous composition; and thereafter curing said impregnant to form homogeneous insulation for said slot portions the components of which are bonded together, and to form non-homogeneous relatively flexible insulation for said end portion.

5. The steps in the method of insulating a coil having slot portions and a connecting portion, for use in a rotating electrical machine, which method comprises wrapping the slot portions with a first insulating material comprising a sheet backing and mica flakes disposed on said backing, said first insulating material being impregnatable by a subsequently applied impregnant, said backing and flakes forming interstices the surfaces of which are compatible with said subsequently applied impregnant; applying to the surfaces of said conductors of said end portion a coating of material incompatible with said subsequently applied impregnant; wrapping said end portion with a second insulating material comprising a sheet backing and mica flakes disposed on the backing and a polymerized resinous binder uniting the mica flakes and the backing, said binder being incompatible with said subsequently applied impregnant; impregnating said wrapped coil with said impregnant comprising a liquid resinous composition; and thereafter curing said impregnant to form homogeneous insulation for said slot portions the components of which are bonded together and to form non-homogeneous relatively flexible insulation for said end portion.

6. The steps in the method of insulating a coil having slot portions and a connecting end portion, for use in a rotating electrical machine, which method comprises wrapping the slot portions with a first insulating material comprising a sheet backing and mica flakes disposed on said backing, said first insulating material being impregnatable by a subsequently applied impregnant, said backing and flakes forming interstices the surfaces of which are compatible with said subsequently applied impregnant; applying to the surfaces of said conductors of said end portion a coating of material incompatible with said subsequently applied impregnant; wrapping said end portion with a second sheet insulating material, formed of rubber or the like, incompatible with said subsequently applied impregnant; impregnating said wrapped coil with said impregnant comprising a liquid resinous composition; and thereafter curing said impregnant to form homogeneous insulation for said slot portions the components of which are bonded together and to form non-homogeneous relatively flexible insulation for said end portion.

7. The steps in the method of insulating a coil having slot portions and a connecting end portion, for use in a rotating electrical machine, which method comprises wrapping the slot portions with a first insulating material comprising a sheet backing and mica flakes disposed on said backing, said first insulating material being impregnatable by a subsequently applied impregnant, said backing and flakes forming interstices the surfaces of which are compatible with said subsequently applied impregnant; wrapping said end portion with a second insulating material comprising a sheet backing and mica flakes disposed on the backing and a varnish type resin uniting the mica flakes and the backing, said varnish type resin being incompatible with said subsequently applied impregnant; impregnating said wrapped coil with said impregnant comprising a liquid polymerizable resinous composition; and thereafter curing said impregnant to form homogeneous insulation for said slot portions the components of which are bonded together and to form non-homogeneous relatively flexible insulation for said end portion.

8. The steps in the method of insulating a coil having slot portions and a connecting end portion, for use in a rotating electrical machine, which method comprises wrapping the slot portions with a first insulating material comprising a sheet backing and mica flakes disposed on said backing, said first insulating material being impregnatable by a subsequently applied impregnant, said backing and flakes forming interstices the surfaces of which are compatible with said subsequently applied impregnant; wrapping said end portion with a second insulating material comprising a sheet backing and mica flakes disposed on the backing and a varnish type resinous binder including a plasticizer uniting the mica flakes and the backing, said binder being incompatible with said subsequently applied impregnant; impregnating said wrapped coil with said impregnant comprising a liquid resinous composition; and thereafter curing said impregnant to form homogeneous insulation for said slot portions the components of which are bonded together and to form non-homogeneous relatively flexible insulation for said end portion.

9. The steps in the method of insulating a coil having slot portions and a connecting end portion, for use in a rotating electrical machine, which method comprises wrappings the slot portions with a first insulating material comprising a sheet backing and mica flakes disposed on said backing, said first insulating material being impregnatable by a subsequently applied impregnant, said backing and flakes forming interstices the surfaces of which are compatible with said subsequently applied impregnant; wrapping said end portion with a second insulating material, formed of silicone rubber incompatible with said subsequently applied impregnant; impregnating said wrapped coil with said impregnant comprising a liquid resinous composition; and thereafter curing said impregnant to form homogeneous insulation for said slot portions the components of which are bonded together and to form non-homogeneous relatively flexible insulation for said end portion.

10. The steps in the method of insulating a coil having slot portions, a connecting end portion, and a plurality of turns having confronting surfaces for use in a rotating electrical machine, which method comprises wrapping the slot portions with a first insulating material comprising a sheet backing and mica flakes disposed on said backing, said first insulating material being impregnatable by a subsequently applied impregnant, said backing and flakes forming interstices the surfaces of which are compatible with said subsequently applied impregnant; applying to said surfaces of the turns of said end portion a coating of mould release incompatible with said subsequently applied impregnant; wrapping said end portion with a second insulating material containing a binder not compatible with said subsequently applied impregnant; impregnating said wrapped coil with said impregnant comprising a liquid resinous composition; and thereafter curing said impregnant to form homogeneous insulation for said slot portions the components of which are bonded together, and to form non-homogeneous relatively flexible insulation for said end portion.

11. The steps in the method of insulating a coil having slot portions, a connecting end portion and a plurality of turns having confronting surfaces, for use in a rotating electrical machine, which method comprises wrapping the slot portions with a first sheet insulating material comprising a sheet backing and mica flakes disposed on said backing, said first insulating material being impregnatable by a subsequently applied impregnant, said backing and flakes forming interstices the surfaces of which are compatible with said subsequently applied impregnant; applying to said surfaces of the turns of said end portion a coating of silicone rubber paste incompatible with said subsequently applied impregnant; wrapping said end portion with a second insulating material containing a binder not compatible with said subsequently applied impregnant; impregnating said wrapped coil with said impregnant comprising a liquid resinous composition; and thereafter curing said impregnant to form homogeneous insulation for said slot portions the components of which are bonded together, and to form non-homogeneous relatively flexible insulation for said end portion.

12. A coil for an electrical machine comprising a slot portion the adjacent turns of which are bonded together, and an end portion the adjacent turns of which are moveable relative to one another, said slot portion being wrapped with a first sheet insulating material comprising backing material and mica flakes forming interstices, said end portion being wrapped with a second sheet insulating material; and a cured impregnant in said sheet insulating materials and compatible with surfaces of said interstices for bonding together only the components of said first sheet insulating material on said slot portion.

13. A coil for an electrical machine comprising a slot portion the adjacent turns of which are bonded together, and an end portion the adjacent turns of which are not bonded to one another, said slot portion being wrapped with a sheet insulating material forming interstices and containing a cured impregnant compatible with the surfaces in said interstices, and said adjacent turns of said end portion being coated with a material not compatible with said impregnant.

14. A coil for an electrical machine comprising a slot portion the adjacent turns of which are bonded together, and an end portion the adjacent turns of which are not bonded to one another, said slot portion being wrapped with a sheet insulating material forming interstices and containing a cured impregnant compatible with the surfaces in said interstices, and said adjacent turns of said end portion being coated with a mould release not compatible with said impregnant.

15. A coil for an electrical machine comprising a slot portion the adjacent turns of which are bonded together, and an end portion the adjacent turns of which are not bonded to one another, said slot portion being wrapped with a sheet insulating material forming interstices and containing a cured impregnant compatible with the surfaces in said interstices, and said adjacent turns of said end portion being coated with a silicone rubber paste not compatible with said impregnant.

16. A coil for an electrical machine comprising a slot portion wrapped with a mica material containing a cured impregnant, said mica material and wrapping material forming interstices the surfaces in which are compatible with said cured impregnant to provide a homogeneous insulation system; and an end portion wrapped with a mica material containing a cured binder and said cured impregnant, said binder and impregnant being incompatible and forming a non-homogeneous insulation system.

17. A coil for an electrical machine comprising a slot portion wrapped with a mica material containing a cured impregnant, said mica material and wrapping material forming interstices the surfaces in which are compatible with said cured impregnant to provide a homogeneous insulation system; and an end portion wrapped with a mica material containing a cured varnish type resin binder and said cured impregnant, said binder and impregnant being incompatible and forming a non-homogeneous insulation system.

18. A coil for an electrical machine comprising a slot portion wrapped with a mica material containing a cured impregnant, said mica material and wrapping material forming interstices the surfaces in which are compatible with said cured impregnant to provide a homogeneous insulation system; and an end portion wrapped with a mica material containing a varnish type binder including a plasticizer and said cured impregnant, said binder and impregnant being incompatible and forming a non-homogeneous insulation system.

19. A coil for an electrical machine comprising a slot portion wrapped with a mica material containing a cured impregnant, said mica material and wrapping material forming interstices the surfaces in which are compatible with said cured impregnant to provide a homogeneous insulation system; and an end portion wrapped with a sheet material formed of rubber or the like and said cured impregnant said sheet material and said cured impregnant being incompatible.

20. A coil for an electrical machine comprising a slot portion wrapped with a mica material forming interstices and impregnated with a cured impregnant compatible with the surfaces in said interstices and an end portion wrapped with a silicone rubber sheet material and coated with said cured impregnant said sheet material and said cured impregnant being incompatible.

21. A coil for an electrical machine comprising a slot portion wrapped with mica material and backing forming interstices and impregnated with a polymerized thermosetting composition compatible with the surfaces in said interstices to form a void-free insulation system on said slot portion; and an end portion wrapped with mica material and backing containing a cured resinous binder and said thermosetting composition, said binder and composition maintaining their respective identities in the end turn insulation system.

22. The steps in the method of insulating a coil having slot portions and a connecting end portion, for use in a rotating electrical machine, which method comprises wrapping the slot portions with a first insulating material comprising a sheet backing and mica flakes disposed on said backing, said first insulating material being impregnatable by a subsequently applied impregnant, said backing and flakes forming interstices the surfaces of which are compatible with said subsequently applied impregnant; wrapping said end portion with a second insulating material containing a binder not compatible with a subsequently applied impregnant; applying a protective wrapping to the entire coil; applying a temporary wrapping of an impervious film to the entire coil; impregnating said wrapped coil with said impregnant comprising a liquid resinous composition; thereafter curing said impregnant to form homogeneous insulation for said slot portions the components of which are bonded together, and to form non-homogeneous relatively flexible insulation for said end portion; and removing said temporary impervious film.

23. The steps in the method of insulating a coil having slot portions and a connecting end portion, for use in a rotating electrical machine, which method comprises wrapping the slot portions with a first insulating material comprising a sheet backing and mica flakes disposed on said backing, said first insulating material being impregnatable by a subsequently applied impregnant, said backing and flakes forming interstices the surfaces of which are compatible with said subsequently applied impregnant; wrapping said end portion with a second insulating material containing a binder not compatible with a subsequently applied impregnant; applying a protective wrapping to the entire coil; applying a temporary wrapping of an impervious film to the entire coil; applying pads to the sides of said end turn with a temporary wrapping of said impervious film; impregnating said wrapped coil with said impregnant comprising a liquid resinous composition; thereafter curing said impregnant to form homogeneous insulation for said slot portions the components of which are bonded together, and to form non-homogeneous relatively flexible insulation for said end portion; and removing said temporary impervious film and pads.

References Cited in the file of this patent
UNITED STATES PATENTS

| | | |
|---|---|---|
| 2,443,663 | Rider | June 22, 1948 |
| 2,479,357 | Hill | Aug. 16, 1949 |
| 2,601,243 | Botts | June 24, 1952 |